US012589523B2

US 12,589,523 B2

(12) United States Patent
Straffi et al.

(10) Patent No.: US 12,589,523 B2
(45) Date of Patent: Mar. 31, 2026

(54) METHOD AND APPARATUS FOR THE PRODUCTION OF A RUBBER COMPOUND USED FOR THE MANUFACTURE OF AN ARTICLE MADE FROM RUBBER OR A PNEUMATIC TIRE TECHNICAL SECTOR

(71) Applicant: Bridgestone Europe NV/SA, Zaventem (BE)

(72) Inventors: Paolo Straffi, Rome (IT); Fabrizio Baroncini, Rome (IT); Giuseppe Pezzullo, Rome (IT)

( * ) Notice: Subject to any disclaimer, the term of this patent is extended or adjusted under 35 U.S.C. 154(b) by 995 days.

(21) Appl. No.: 17/775,351

(22) PCT Filed: Nov. 9, 2020

(86) PCT No.: PCT/IB2020/060528
§ 371 (c)(1),
(2) Date: May 9, 2022

(87) PCT Pub. No.: WO2021/094896
PCT Pub. Date: May 20, 2021

(65) Prior Publication Data
US 2022/0388200 A1 Dec. 8, 2022

(30) Foreign Application Priority Data

Nov. 11, 2019 (IT) ......................... 102019000020757

(51) Int. Cl.
B29B 7/12 (2006.01)
B29B 7/82 (2006.01)
B29C 48/68 (2019.01)
B29C 48/80 (2019.01)

(52) U.S. Cl.
CPC ............. B29B 7/125 (2013.01); B29B 7/823 (2013.01); B29C 48/6803 (2019.02); B29C 48/832 (2019.02)

(58) Field of Classification Search
CPC ......... B29B 7/125; B29B 7/823; B29B 7/429; B29B 7/44; B29B 7/726; B29B 7/7495;
(Continued)

(56) References Cited

U.S. PATENT DOCUMENTS 4,124,307 A * 11/1978 Anisic ..................... B29B 7/428
366/147
4,194,842 A * 3/1980 Puthawala ................ G21F 9/14
366/97

(Continued)

FOREIGN PATENT DOCUMENTS

CN 103153565 A 6/2013
CN 107936331 A 4/2018
(Continued)

OTHER PUBLICATIONS

International Searching Authority: European Patent Office Search Report for corresponding International Patent Application No. PCT/IB2020/060529, dated Feb. 5, 2021, 4 pages.

*Primary Examiner* — Charles Cooley
(74) *Attorney, Agent, or Firm* — Patterson Intellectual Property Law, PC

(57) ABSTRACT
A method and an apparatus (1) for the production of a compound used for the manufacture of an article made from rubber or a pneumatic tire by a continuous mixer (2) divided into a mixing section (MS) wherein the mixing of the components of the compound being processed exclusively takes place; a reaction section (RS) located downstream of the mixing section (MS) wherein a mild reaction of the compound being processed is activated; wherein, the reaction section (RS) is heated to increase the temperature of the compound being processed in relation to the temperature of the compound being processed within the mixing section (MS); and a cooling section (CS) located downstream of the reaction section (RS) and cooled to reduce the temperature
(Continued)

of the compound being processed down to a temperature that will inhibit further development of the reaction that takes place within the reaction section (RS).

15 Claims, 3 Drawing Sheets

(58) Field of Classification Search
CPC ......... B29B 7/826; B29B 7/481; B29B 7/485; B29B 7/489; B29B 7/90; B29C 48/6803; B29C 48/832; B29C 48/297; B29C 48/405; B29C 48/515; B29C 48/67; B29C 48/684; B29C 48/82; B29C 48/834; B29C 48/802
USPC ........................................... 366/76.1–86, 149
See application file for complete search history.

(56) References Cited

U.S. PATENT DOCUMENTS

| | | | | |
|---|---|---|---|---|
| 4,249,877 | A | * | 2/1981 | Machen ................ B29C 48/395 366/76.9 |
| 5,374,387 | A | | 12/1994 | Barnes et al. |
| 5,439,974 | A | | 8/1995 | Mattson |
| 9,481,795 | B2 | | 11/2016 | Uhl |
| 2005/0213423 | A1 | * | 9/2005 | Ferencz .................. B29C 48/29 366/76.2 |
| 2022/0388200 | A1 | * | 12/2022 | Straffi ................... B29B 7/7495 |

FOREIGN PATENT DOCUMENTS

| | | | |
|---|---|---|---|
| EP | 0490056 | A1 | 6/1992 |
| EP | 0611078 | A1 | 8/1994 |
| EP | 1057603 | A1 | 12/2000 |
| EP | 1757420 | A1 | 2/2007 |
| FR | 3075085 | A1 | 6/2019 |
| JP | H04276407 | A | 10/1992 |
| JP | H06240153 | A | 8/1994 |
| JP | H11507881 | A | 7/1999 |
| JP | 2010089423 | A | 4/2010 |
| JP | 2011140587 | A | 7/2011 |
| WO | 2003031131 | A1 | 4/2003 |
| WO | 2004007172 | A1 | 1/2004 |
| WO | 2010132166 | A1 | 11/2010 |
| WO | 2014099117 | A1 | 6/2014 |
| WO | 2018198630 | A1 | 11/2018 |

* cited by examiner

METHOD AND APPARATUS FOR THE PRODUCTION OF A RUBBER COMPOUND USED FOR THE MANUFACTURE OF AN ARTICLE MADE FROM RUBBER OR A PNEUMATIC TIRE TECHNICAL SECTOR

TECHNICAL SECTOR

The present invention relates to a method and an apparatus for the production of a compound used for the manufacture of an article made from rubber or a pneumatic tire.

PRIOR ART

An apparatus for the production of a compound used for the manufacture of articles made from rubber and pneumatic tires typically comprises a continuous mixer which is supplied with the components of the compound and comprises an outer sleeve provided with two sealing heads for closing each of the ends of said sleeve and wherein a chamber is defined for housing the compound being processed.

Preferably, the continuous mixing is performed by means of a single screw extruder (or twin screw or even of the multiple screw planetary type) having at least one shaft housed inside the sleeve that carries and connects to an auger and actuator means for bringing the shaft into rotation. Furthermore, the apparatus typically comprises a number of hoppers for supplying the components of the compound that are arranged at one end of the continuous mixer inlet and/or distributed along a direction of flow of the compound being processed. Finally, the apparatus comprises an extrusion head that is coupled directly and with structural continuity to the chamber in such a way as to receive at the inlet the compound produced and to dispense at the outlet the compound in the required form, for example in the form of a strip with the required transverse dimensions.

Along the path in the direction of flow within the chamber, the components of the compound are subjected to temperature gradients, shear stress and pressure that is applied in order to allow for mixing and at the same time to push the material along in the direction of flow. It has, however, been verified that during mixing undesirable chemical reactions may take place or else desirable chemical reactions may take place, but with a degree of development of the reaction that is not in line with what is necessary. For these reasons, the compounds produced by a continuous process, where chemical reactions take place during the mixing step, can have characteristics that are far from that specified.

In the absence of rapid temperature control, such chemical reactions may continue to progress as long as cooling takes place which inhibits the inception or the further continuation thereof.

DESCRIPTION OF THE INVENTION

The object of the present invention is therefore to provide a method for the production of a compound used for the manufacture of an article made from rubber or a pneumatic tire which is free from the drawbacks of the state of the art and that is, in particular, economical and easy to implement and which does not require a cooling device at the outlet of the continuous mixer.

A further object of the present invention is therefore to provide an apparatus for the production of a compound used for the manufacture of an article made from rubber or a pneumatic tire which is free from the drawbacks of the state of the art and that is, in particular, economical and easy to manufacture.

According to the present invention, a method and an apparatus are provided for the production of a compound as set forth in the appended claims.

BRIEF DESCRIPTION OF THE DRAWINGS

The present invention will now be described with reference to the attached drawings, which show an exemplary, non-limiting embodiment, wherein.

PREFERRED EMBODIMENTS OF THE INVENTION

Figure 1:
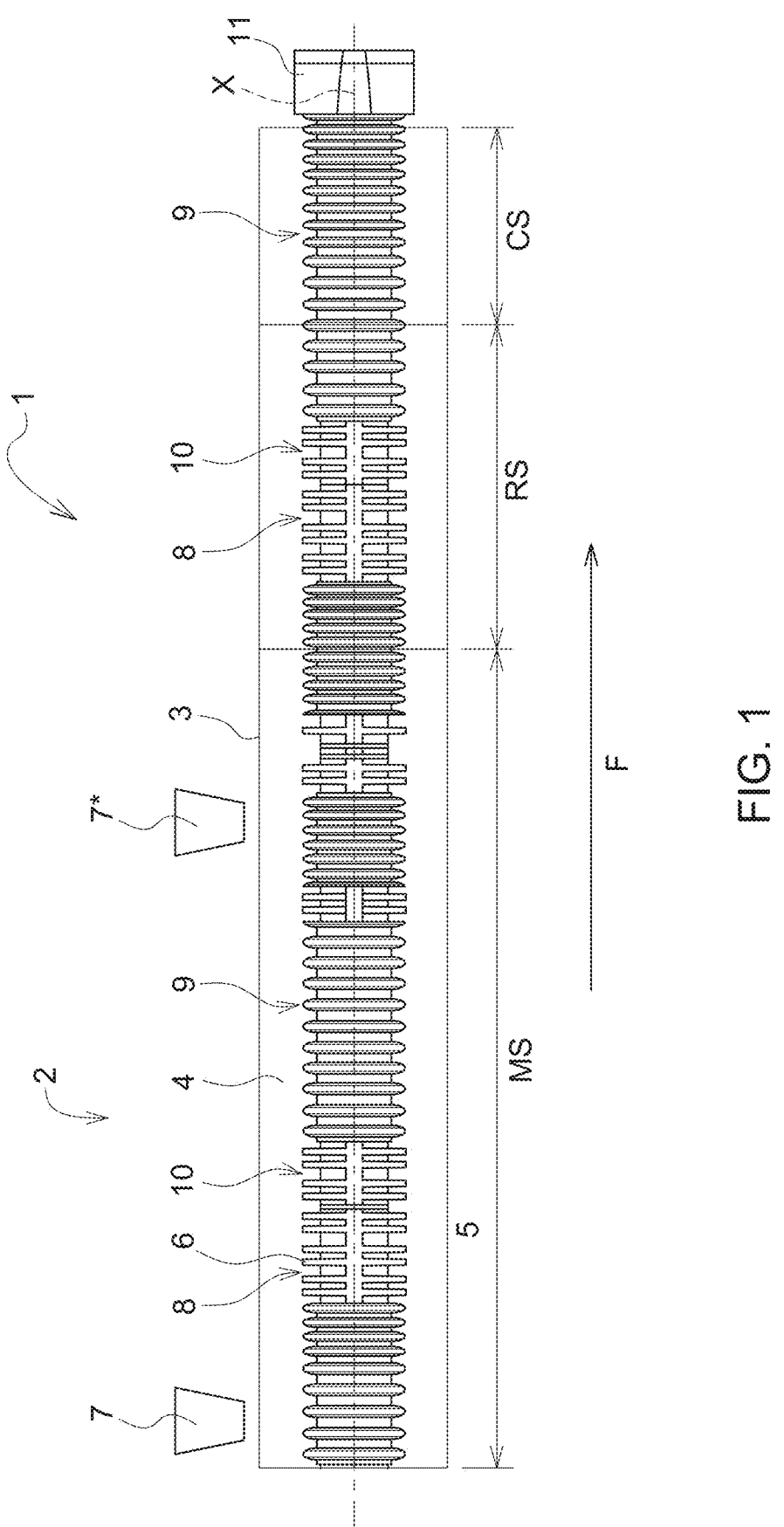
FIG. 1 is a schematic side view of a first variant of an apparatus for the production of a compound used for the manufacture of rubber products and pneumatic tires manufactured according to the present invention.

In FIG. 1, the numeral 1 denotes, in the entirety thereof, an apparatus for the production of a compound used for the manufacture of rubber products and pneumatic tires. The apparatus 1 comprises a continuous mixer 2 which is supplied with the components of the compound.

The continuous mixer 2 comprises an external sleeve 3 provided with two long-life sealing heads (not shown) for closing each of the ends of said sleeve 3.

Preferably, the sleeve 3 has a tubular shape with respect to an axis X, and within the interior thereof a chamber 4 is defined for housing the compound being processed.

According to a first variant, the continuous mixer 2 is implemented by means of a single screw extruder. Inside the sleeve 3, a shaft 5 is housed that is coaxial to the axis X and that carries and is connected to an auger 6. The apparatus further comprises actuating means, of a known type and not described in detail, for rotating the shaft 5 about the axis X. The shaft 5 is implemented by means of a series of segments that are mutually coaxial, arranged in sequence and connected to one another by means of intermediate supporting elements (which typically serve as a connecting element between the different segments of the shaft 5 and, at the same time, act as a structural support to prevent deflections of the shaft 5 itself). According to a further variant, the continuous mixer 2 is implemented by means of a twin-screw extruder. Inside the outer sleeve 3, a pair of shafts 5 is housed that are provided with respective axes which are parallel therebetween (and parallel to the axis X), wherein each thereof carries and is connected to an auger 6. The apparatus then comprises actuator means, of a known type and not described in detail, for rotating each shaft 5 around the axis thereof in a concordant manner (corotating) in relation to the other shaft 5 or in a discordant manner (counter rotating) in relation to the other shaft 5.

The mixing of the components takes place while moving in a direction of flow F of the compound being processed within the chamber 4.

Furthermore, the apparatus 1 comprises at least one supply inlet 7 or hopper 7 for the supplying of the components of the compound. Alternatively, any type of dispensers can be used at the hoppers 7 that are suitable for supplying the components of the compound in solid state, liquid or gaseous form; amongst which preferably (but as a non-limiting example) extruders, single and multi-screw feeders, rotary feeders, injector devices for liquids or gas, conveyor belts, vibrating belts.

The hopper 7 is arranged at one end of the inlet of the continuous mixer 2.

Alternatively, the continuous mixer 2 comprises a plurality of hoppers 7, each for supplying at least one respective component of the compound; wherein the hoppers 7 are distributed along the direction of flow F of the compound being processed. The supplying of the components of the compound being processed to the continuous mixer 2 typically takes place by means of a continuous dosing system (of a known type, not illustrated and not described in detail) located upstream of the apparatus 1 itself.

The continuous mixer 2 is formed from the alternation of mixture portions (or sections) 8, transport portions 9, and mixing portions 10. According to a preferred variant, the continuous mixer 2 also comprises reversing transport elements and separation elements between two distinct zones.

Within the mixture portions 8, the components of the compound are subjected to an increase in shear stress for the formation of a homogeneous compound at a macroscopic level (in other words, the elements are incorporated within the polymer matrix of the compound).

The transport portions 6 are instead implemented in order to deliver the compound being processed from one longitudinal end of the chamber 4 to the other, subjecting the components of the compound to negligible changes in shear stress and applied pressure.

Subsequently, the compound may encounter one or more dispersive mixing elements 10 wherein the shear stresses applied increase considerably thereby allowing for the dispersion of the components of the compound within the matrix. The compound being processed may alternatively be presented in solid state form or else in a completely molten state or else partly in solid state form and partly in the molten state. The conveying portions 6 are configured to push the material in the direction of flow F, exerting mixing upon the same that is substantially zero or very low.

The different mixture, transport and mixing portions 8, 9 and 10 of the continuous mixer 2 are arranged/coupled in series with structural continuity in such a way that the respective inner chambers are physically and seamlessly connected. For example, the different portions 8, 9 and 10 of the continuous mixer 2 are directly flanged one after the other.

According to a preferred embodiment, the chamber 4 has a diameter D, which, in the case of a twin-screw extruder, has a value of between 20 and 250 mm; preferably, the chamber 4 has a diameter D of between 50 and 150 mm. According to a preferred embodiment, the apparatus 1 has a ratio between the length L along the direction of flow F and the diameter D of between 50 and 150; preferably the apparatus 1 has a ratio between the length L along the direction of flow F and the diameter D of between 60 and 140.

Finally, according to a preferred variant the apparatus 1 comprises an extrusion head 11 that is directly coupled, with structural continuity, to the chamber 4 in such a way as to receive at the inlet the compound produced and to dispense at the outlet the compound in the required form, for example in the form of a strip having the required transverse dimensions. The apparatus 1 can then comprise a transport device (typically a roller or a conveyor belt of a known type and not illustrated and described in detail) located downstream of the extrusion head 11 and intended to receive from the same extrusion head 11 the compound and to convey it to a subsequent work station.

The apparatus 1 is divided into three sections indicated respectively with MS, RS and CS.

The section indicated with MS is the section wherein the mixing of the compound being processed exclusively takes place.

The section indicated with RS is arranged downstream of the mixing section MS and represents the reaction section wherein a chemical reaction (for example vulcanization) is activated and which changes the characteristics of the compound being processed. Typically, within the reaction section RS there is a rise in temperature of the compound under reaction in relation to the adjacent mixing and cooling sections MS, CS. The increase in temperature within the reaction section RS is produced by means of heating means (for example electrical resistances) that surround the sleeve 3.

The section indicated with CS is located downstream of the reaction section RS and represents the cooling section wherein the compound being processed is cooled. In particular, the compound being processed is cooled down to a temperature that will inhibit further development of the reaction that takes place within the reaction section RS. Any reagents introduced downstream of the reaction section RS (upstream of the cooling section CS) encounter temperature and pressure conditions such as to prevent the reaction under the conditions of the cooling section CS within the residence times in the same area. The cooling section CS is provided with means for the cooling of the compound being processed by means of a fluid (for example water). The means for the cooling of the compound being processed are implemented in such a way as to surround the sleeve 3 and, consequently, the compound while moving in the direction of flow F.

It is important to highlight that each mixing, reaction and cooling section MS, RS, CS is defined by a suitable combination of mixture, transport and mixing portions 8, 9, 10 placed in succession one after another.

The three mixing, reaction and cooling sections MS, RS, CS are arranged in succession one after another with structural continuity in such a way that the respective inner chambers are physically and seamlessly connected.

Furthermore, each of said mixing, reaction and cooling sections MS, RS, CS is provided with a number (including zero) of hoppers 7 for the supply of at least one component of the compound and/or with volatile component extraction points.

The mixing section MS preferably has a length of between 40% and 80% of the entire length L along the direction of flow F of the apparatus 1.

The reaction section RS preferably has a length of between 40% and 10% of the entire length L along the direction of flow F of the apparatus 1.

The cooling section CS preferably has a length of between 30% and 10% of the entire length L along the direction of flow F of the apparatus 1.

The method for the production of a compound used for the manufacture of an article made from rubber or a pneumatic tire by means of the apparatus 1 described in the discussion above includes:

at least one step for supplying the components of the compound to the continuous mixer 2;

a step for the continuous mixing of the components of the compound being processed that occurs within the mixing section MS;

a reaction step that is subsequent to the mixing step, wherein a reaction of the compound being processed is activated by means of an increase in temperature in relation to the mixing step; wherein the reaction step takes place within the respective reaction section RS;

a cooling step that is subsequent to the reaction step and which takes place at the corresponding cooling CS section; wherein the temperature of the compound being processed is lowered until it reaches a value such as to prevent further development of the reaction that takes place during the reaction step.

The duration of the mixing, reaction and cooling steps is variable; in particular, the duration of the mixing, reaction and cooling steps is variable as a function of the components of the compound introduced during the supply step.

Furthermore, the step of continuously mixing the components of the compound being processed is carried out at a reference temperature $T_{ref}$; the reaction step, subsequent to the mixing step, is performed at a reaction temperature $T_{react}$ that is greater than the reference temperature $T_{ref}$ in such a way as to activate the mild reaction of the compound being processed; and, finally, the cooling step, subsequent to the reaction step, is performed at a cooling temperature $T_{cool}$ that is lower than the reaction temperature $T_{react}$, in order to prevent (or block) further development of the reaction that takes place during the reaction step.

In more detail, the difference between the reaction temperature $T_{react}$ and the reference temperature $T_{ref}$ is between 5° C. and 45° C.; preferably, the difference between the reaction temperature $T_{react}$ and the reference temperature $T_{ref}$ is between 15° C. and 45° C.

Furthermore, the difference between the cooling temperature $T_{cool}$ and the reaction temperature $T_{react}$ is between 15° C. and 45° C.; preferably, the difference between the cooling temperature $T_{cool}$ and the reaction temperature $T_{react}$ is between 20° C. and 40° C.

According to a preferred variant, the cooling temperature $T_{cool}$ is substantially lower than or equal to the reference temperature $T_{ref}$.

According to a preferred variant, the reaction temperature $T_{react}$ is between 120° C. and 165° C.; preferably, the reaction temperature $T_{react}$ is between 140° C. and 165° C.

It was experimentally verified that with the aforesaid temperature difference values it is possible to efficiently activate the mild reaction of the compound being processed and to subsequently stop it, thereby reducing to a minimum the degradation of the components of the compound.

According to a first embodiment, the method comprises a further step of supplying at least one component of the compound that is intended to block the reaction step; wherein said second supply step is between the first reaction step and the cooling step.

According to a second embodiment, the method anticipates a further step of supplying at least one component of the compound between the reaction step and the cooling step that is intended to activate a second reaction step subsequent to the cooling step.

The applicant has experimentally verified that the compounds produced by means of apparatus 1 of the type described so far have uniform characteristics.

Below are illustrated some examples of compounds that can be obtained by means of the apparatus 1 described in the preceding discussion by way of illustrative and not limiting purpose.

Example 1 (FIG. 1)

In the mixing section MS, the following components are introduced through the hopper 7. In particular, the formulation includes the following components with the corresponding weights expressed in percentage terms:

| COMPONENT | WEIGHT % |
|---|---|
| Rubber | 60-65% |
| Reinforcing filler | 30-35% |
| Plasticizers | 0.5-1.5% |
| Antioxidants | 0.5-1.5% |
| Protective Waxes | 0.5-1.5% |
| Zinc oxide | 1.5-2% |
| Stearic acid | 1.5-2% |
| Sulfur | 0.5-1.0% |
| Accelerants | 0.5-1.0% |

The rubber used is preferably the styrene-butadiene copolymer. The reinforcement filler used is preferably carbon black.

Within the mixing section MS, the compound being processed is mixed at temperatures not exceeding 120° C., thereby reducing to a minimum the degradation of the styrene-butadiene copolymer.

The residence time within the mixing section MS is variable depending upon the type and the amount of reinforcing filler introduced. Preferably, the residence time within the mixing section MS is less than or equal to five minutes.

Immediately upstream of the reaction section RS, vulcanization reaction promoters and vulcanizing agents are introduced through a further hopper 7*. It is important to note that peroxides are not introduced into the mixing section MS.

Inside the reaction section RS, the vulcanization reaction promoters and the vulcanizing agents are dispersed within the compound being processed, and a mild vulcanization reaction is activated. Preferably, the vulcanization reaction is carried out at temperatures above 140° C. In particular, according to a preferred variant, the vulcanization reaction is carried out at temperatures above 160° C. The residence time within the reaction section RS is variable and is determined in such a way that the compound being processed is not vulcanized at percentages higher than 20% (according to ISO 6502) in relation to the material at the outlet. Preferably, the residence time within the reaction section RS is greater than or equal to sixty seconds. In the case wherein the vulcanization reaction is carried out at temperatures above 160° C., the residence time within the reaction section RS may be less than sixty seconds.

To make it possible for the compound being processed not to be vulcanized at percentages higher than 20% (according to ISO 6502) in relation to the material at the outlet, it is necessary to have a rapid reduction in the temperature within the cooling section CS.

Within the cooling section CS, the compound being processed is preferably cooled to temperatures below 120° C. The residence time within the cooling section CS is variable. Preferably, the residence time within the cooling section CS is greater than or equal to sixty seconds.

Subsequently, the compound produced at the extrusion head can be conveyed to a subsequent thermoforming station.

Figure 2:
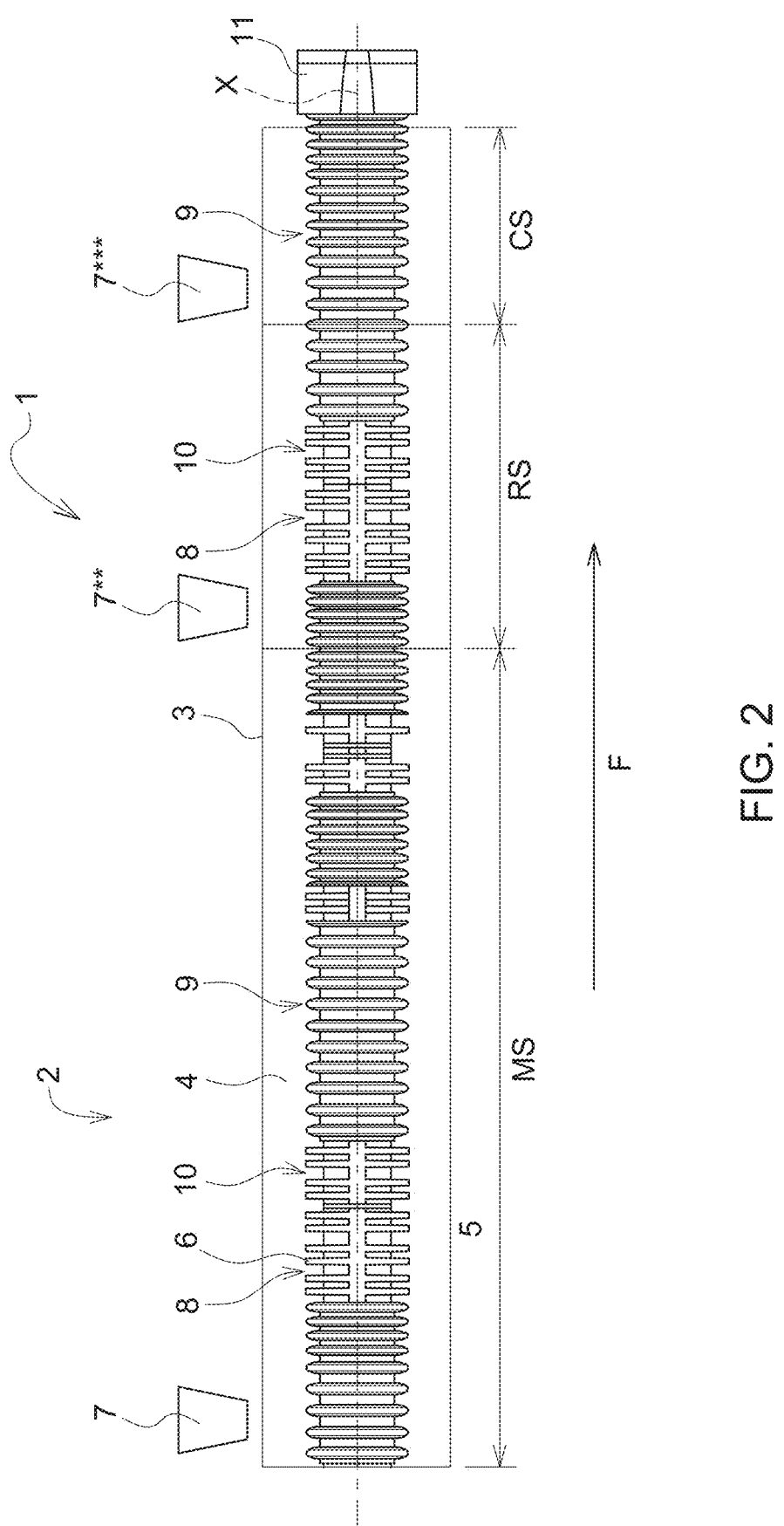
FIG. 2 is a schematic side view of a second variant of the apparatus of FIG. 1.

Example 2 (FIG. 2)

In the mixing section MS, the following components are introduced through the hopper 7. In particular, the formulation includes the following components with the corresponding weights expressed in percentage terms:

| COMPONENT | WEIGHT % |
| --- | --- |
| Rubber | 60-65% |
| Reinforcing filler | 30-35% |
| Plasticizers | 0.5-1.5% |
| Antioxidants | 0.5-1.5% |
| Protective Waxes | 0.5-1.5% |
| Zinc oxide | 1.5-2% |
| Stearic acid | 1.5-2% |
| Phenolic resin | 1-2% |
| Hexamethylenetetramine | 0.25-0.5% |
| Sulfur | 0.5-1% |
| Accelerants | 0.5-1% |

The rubber used is preferably the styrene-butadiene copolymer. The reinforcement filler used is preferably carbon black.

Within the mixing section MS, the compound being processed is mixed at temperatures not exceeding 120° C., thereby reducing to a minimum the degradation of the styrene-butadiene copolymer.

The residence time within the mixing section MS is variable depending upon the type and the amount of reinforcing filler introduced. Preferably, the residence time within the mixing section MS is less than or equal to five minutes.

Within the reaction section RS, a polycondensation reaction is activated. In particular, within the reaction section RS, the phenolic resin and hexamethylenetetramine are introduced through a further hopper 7**. Preferably, the polycondensation reaction is carried out at temperatures less than 140° C. In particular, according to a preferred variant, the polycondensation reaction is carried out at temperatures between 120° C. and 140° C. The residence time within the reaction section RS is less than two minutes.

Finally, within the cooling section CS, the compound is cooled to temperatures below 100° C., at the entrance to the cooling section CS, sulfur and accelerators are introduced through a further hopper 7***. The residence time within the cooling section CS is variable. Preferably, the residence time within the cooling section CS is greater than or equal to sixty seconds.

Figure 3:
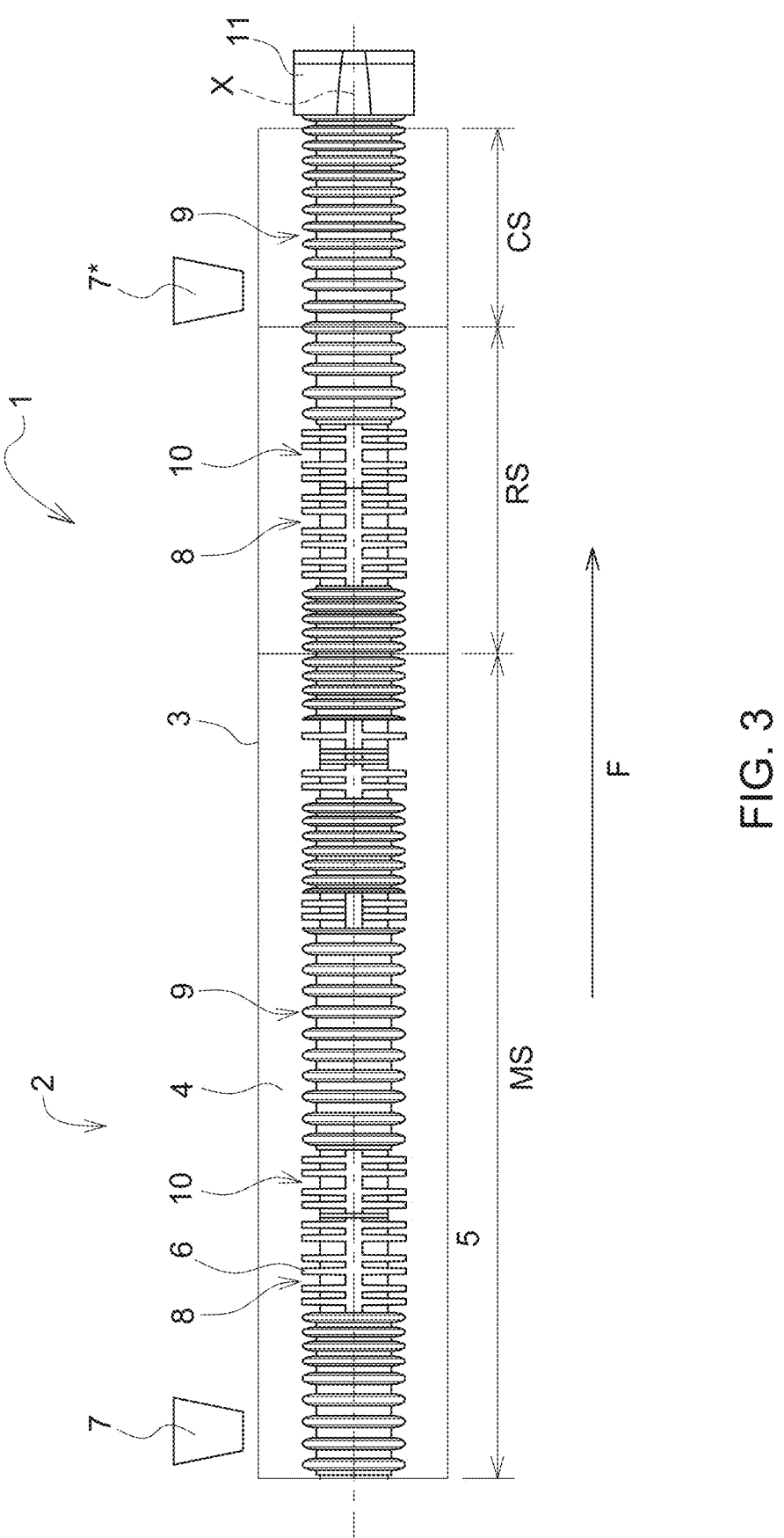
FIG. 3 is a schematic side view of a third variant of the apparatus of FIG. 1.

Example 3 (FIG. 3)

In the mixing section MS, the following components are introduced through the hopper 7. In particular, the formulation includes the following components with the corresponding weights expressed in percentage terms:

| COMPONENT | WEIGHT % |
| --- | --- |
| Rubber | 60-65% |
| Reinforcing filler | 30-35% |
| Plasticizers | 0.5-3.0% |
| Antioxidants | 0.5-1.5% |
| Protective Waxes | 0.5-1.5% |
| Zinc oxide | 1.5-2% |
| Stearic acid | 1.5-2% |
| Additive Si69 ® | 3-3.5% |
| Sulfur | 0.5-1% |
| Accelerants | 0.5-1% |

The rubber used is preferably the styrene-butadiene copolymer. The reinforcement filler used is preferably silica.

Within the mixing section MS, the compound being processed is mixed at temperatures not exceeding 120° C., thereby reducing to a minimum the degradation of the styrene-butadiene copolymer.

The residence time within the mixing section MS is variable depending upon the type and the amount of reinforcing filler introduced. Preferably, the residence time within the mixing section MS is less than or equal to five minutes.

Within the reaction section RS, the silica/silane reaction is activated (using the additive Si69®).

Preferably, the silica/silane reaction is carried out at temperatures higher than 140° C. In particular, according to a preferred variant, the silica/silane reaction of is carried out at temperatures not exceeding 165° C. Furthermore, along the length of the reaction section RS, one or more of the volatile compounds extraction points are provided in order to complete the silica/silane reaction within a shorter period of time, i.e., with residence times within the reaction section RS of less than 120 seconds. Within the cooling section CS, the compound being processed is cooled to temperatures below 120° C. Furthermore, within the cooling section CS, vulcanizing agents are introduced through a hopper 7'. The residence time within the cooling section CS is variable. Preferably, the residence time within the cooling section CS is greater than or equal to sixty seconds. Subsequently, the compound produced at the extrusion head can be further cooled (for example, in a water bath), and/or it may be conveyed to a subsequent thermoforming station.

It is also important to highlight that, according to a further variant, the cooling section CS is provided with at least one inlet 7' for the supply of components of the compound that are necessary in order to develop reactions downstream of the apparatus 1 itself.

It is important to highlight that, in Examples 2 and 3 described above, the respective cooling sections CS are provided with at least one inlet 7' for the supply of respective components of the compound that are suitable for preventing further development of the reaction that takes place within the reaction section RS located upstream.

The invention claimed is:

1. A method for production of a compound used for manufacture of an article made of rubber or of a pneumatic tire via an apparatus comprising a continuous mixer having a section in which components of the compound being processed are mixed, a reaction section located downstream of the mixing section and in which a rise in temperature of the compound is produced, and a cooling section located downstream of the reaction section and in which the compound being processed is cooled, wherein said reaction and cooling sections are arranged in succession one after another with structural continuity, the method comprising:

a first step of supplying the components of the compound to the continuous mixer;

a step of continuously mixing the components of the compound being processed carried out at a reference temperature;

a first reaction step, subsequent to the mixing step, performed at a reaction temperature that is greater than the reference temperature in such a way as to activate a mild reaction of the compound being processed; and a cooling step, subsequent to the reaction step, performed at a cooling temperature that is lower than the reaction temperature, in order to prevent further development of the reaction that takes place during the reaction step.

2. The method of claim 1, further comprising a second step of supplying at least one component of the compound to block the reaction step, wherein said second supply step is included between the first reaction step and the cooling step.

3. The method of claim 1, further comprising:
a second step of supplying at least one component of the compound, wherein said second supply step is included between the first reaction step and the cooling step; and
a second reaction step, subsequent to the cooling step.

4. The method of claim 1, wherein a difference between the reaction temperature and the reference temperature is between 5° C. and 45° C.

5. The method of claim 4, wherein the difference between the reaction temperature and the reference temperature is between 15° C. and 45° C.

6. The method of claim 1, wherein a difference between the cooling temperature and the reaction temperature is between 15° C. and 45° C.

7. The method of claim 6, wherein the difference between the cooling temperature and the reaction temperature is between 20° C. and 40° C.

8. The method of claim 1, wherein the cooling temperature is lower than or equal to the reference temperature.

9. The method of claim 1, wherein the reaction temperature is between 120° C. and 165° C.

10. The method of claim 9, wherein the reaction temperature is between 140° C. and 165° C.

11. An apparatus configured to implement a method for production of a compound used for manufacture of an article made from rubber or a pneumatic tire made in accordance with claim 1, wherein:

the mixing section has a length of between 40% and 80% of an entire length of the apparatus along a direction of flow;
the reaction section has a length of between 40% and 10% of an entire length of the apparatus along a direction of flow; and
the cooling section has a length of between 30% and 10% of an entire length of the apparatus along a direction of flow.

12. The apparatus of claim 11, wherein the continuous mixer comprises a sleeve housing the compound being processed, and the cooling section is implemented in such a way as to surround the sleeve and the compound being processed along a direction of flow.

13. The apparatus of claim 11, wherein the continuous mixer comprises mixture, transport, and mixing portions placed in succession one after another, with structural continuity in such a way that the respective internal chambers are physically and seamlessly connected.

14. The apparatus of claim 13, wherein each of said mixing, reaction, and cooling sections is defined by a suitable-further comprises a combination of the mixture, transport, and mixing portions, placed in succession one after another.

15. The apparatus of claim 11, wherein each of said mixing, reaction, and cooling sections is provided with a number of hoppers for supply of at least one component of the compound and/or volatile component extraction points.

* * * * *